United States Patent
Ikizyan et al.

(10) Patent No.: US 12,518,496 B2
(45) Date of Patent: Jan. 6, 2026

(54) METHODS AND APPARATUS FOR SALIENCY BASED FRAME COLOR ENHANCEMENT

(71) Applicant: QUALCOMM Incorporated, San Diego, CA (US)

(72) Inventors: Ike Ikizyan, San Diego, CA (US); Gregory Vansickle, Stouffville (CA); Alireza Shoa Hassani Lashdan, Burlington (CA); Simiao Wu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/275,803

(22) PCT Filed: Mar. 22, 2021

(86) PCT No.: PCT/CN2021/082081
§ 371 (c)(1),
(2) Date: Aug. 3, 2023

(87) PCT Pub. No.: WO2022/198383
PCT Pub. Date: Sep. 29, 2022

(65) Prior Publication Data
US 2024/0096042 A1    Mar. 21, 2024

(51) Int. Cl.
*G06T 19/20*    (2011.01)
*G06T 5/50*    (2006.01)
(Continued)

(52) U.S. Cl.
CPC ............ *G06T 19/20* (2013.01); *G06T 5/50* (2013.01); *G06T 5/94* (2024.01); *G06T 7/11* (2017.01);
(Continued)

(58) Field of Classification Search
CPC ... G06T 19/20; G06T 7/50; G06T 7/11; G06T 7/90; G06T 5/94
(Continued)

(56) References Cited

U.S. PATENT DOCUMENTS

| 6,404,920 B1 | 6/2002 | Hsu |
| 9,443,316 B1* | 9/2016 | Takeda ............... G06V 30/2504 |

(Continued)

FOREIGN PATENT DOCUMENTS

| CN | 101299277 A | 11/2008 |
| CN | 104471922 A | 3/2015 |

(Continued)

OTHER PUBLICATIONS

International Search Report and Written Opinion—PCT/CN2021/082081—ISA/EPO—Dec. 28, 2021.
(Continued)

*Primary Examiner* — Thomas J Lett
(74) *Attorney, Agent, or Firm* — Procopio, Cory, Hargreaves & Savitch LLP

(57) ABSTRACT

The present disclosure relates to methods and devices for display processing including an apparatus, e.g., a DPU. The apparatus may detect at least one of a scene change between successive frames of a plurality of frames or a threshold number of received frames of the plurality of frames. The apparatus may also generate at least one of a saliency map, an object segmentation map, or a depth map based on a down-sampled image of a first frame. The apparatus may also apply a CMF for a color space associated with the plurality of frames to the plurality of pixels in one or more subsequent frames of the plurality of frames, the CMF being applied until at least one of a subsequent scene change or a subsequent threshold number of received frames.

34 Claims, 7 Drawing Sheets

(51) Int. Cl.
  *G06T 5/94*   (2024.01)
  *G06T 7/11*   (2017.01)
  *G06T 7/50*   (2017.01)
  *G06T 7/90*   (2017.01)

(52) U.S. Cl.
  CPC .................. *G06T 7/50* (2017.01); *G06T 7/90* (2017.01); *G06T 2207/10024* (2013.01); *G06T 2207/20084* (2013.01); *G06T 2219/2012* (2013.01)

(58) Field of Classification Search
  USPC ......................................................... 345/426
  See application file for complete search history.

(56) References Cited

U.S. PATENT DOCUMENTS

| | | | | |
|---|---|---|---|---|
| 11,677,989 | B2* | 6/2023 | Ferrara | H04N 21/234327 375/240.02 |
| 2016/0150211 | A1 | 5/2016 | Hwang et al. | |
| 2018/0315199 | A1 | 11/2018 | Socek et al. | |
| 2019/0124745 | A1 | 4/2019 | Mason et al. | |

FOREIGN PATENT DOCUMENTS

| | | |
|---|---|---|
| CN | 110785989 A | 2/2020 |
| CN | 111950653 A | 11/2020 |
| JP | 2018524732 A | 8/2018 |
| TW | 201143398 A | 12/2011 |
| TW | 202109453 A | 3/2021 |
| WO | 2018136432 A1 | 7/2018 |
| WO | 2020074896 A1 | 4/2020 |

OTHER PUBLICATIONS

An S., et al., "RotateView: A Video Composition System for Interactive Product Display", IEEE Transactions on Multimedia, IEEE, USA, vol. 21, No. 12, Dec. 1, 2019, pp. 3095-3105, XP011757379, Abstract, Sec. III.B, III.C. 1, III.C.2, IV.B.

An S., et al., "RotateView: A Video Composition System for Interactive Product. Display", IEEE Transactions on Multimedia, vol. 21, No. 12, Dec. 1, 2019, pp. 3095-3105.

Heo Y.S., et al., "Consistent Color and Detail Transfer from Multiple Source Images for Video and Images", Visual Computer, Springer, Berlin, DE, vol. 32, No. 10, Oct. 28, 2015, pp. 1273-1289, XP036064316, Abstract, Sec. 3, 3.1, 3.2, 3.3, 3.5, 4.1.

Heo Y.S., et al., "Consistent Color and Detail Transfer from Multiple Source Images for Video and Images", Visual Computer, Springer, vol. 32, No. 10, Oct. 28, 2015, pp. 1273-1289.

Supplementary European Search Report—EP21932018—Search Authority—Munich—Dec. 4, 2024.

Taiwan Search Report—TW111106759—TIPO—Jul. 30, 2025.

* cited by examiner

METHODS AND APPARATUS FOR SALIENCY BASED FRAME COLOR ENHANCEMENT

CROSS REFERENCE TO RELATED APPLICATION(S)

This application is a National Stage Application filed under 35 U.S.C. § 371 of PCT International Application No. PCT/CN2021/082081, entitled "METHODS AND APPARATUS FOR SALIENCY BASED FRAME COLOR ENHANCEMENT" and filed Mar. 22, 2021, which is expressly incorporated by reference herein in its entirety.

TECHNICAL FIELD

The present disclosure relates generally to processing systems and, more particularly, to one or more techniques for display or image processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that can perform display or image processing. The apparatus may detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames. The apparatus may also down-sample an image of the first frame to produce the down-sampled image of the first frame, where the down-sampled image is produced upon detecting at least one of the scene change between successive frames or the threshold number of received frames. The apparatus may also generate at least one of a saliency map or a depth map based on a down-sampled image of the first frame, the first frame including a plurality of first pixels and the down-sampled image including a plurality of down-sampled pixels. Moreover, the apparatus may apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames. The apparatus may also adjust at least one of the one or more low-saliency colors, the one or more high-saliency colors, or depth information of the plurality of the down-sampled pixels, where the depth information corresponds to the one or more colors including a depth within the depth range or the one or more colors including a depth outside of the depth range.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
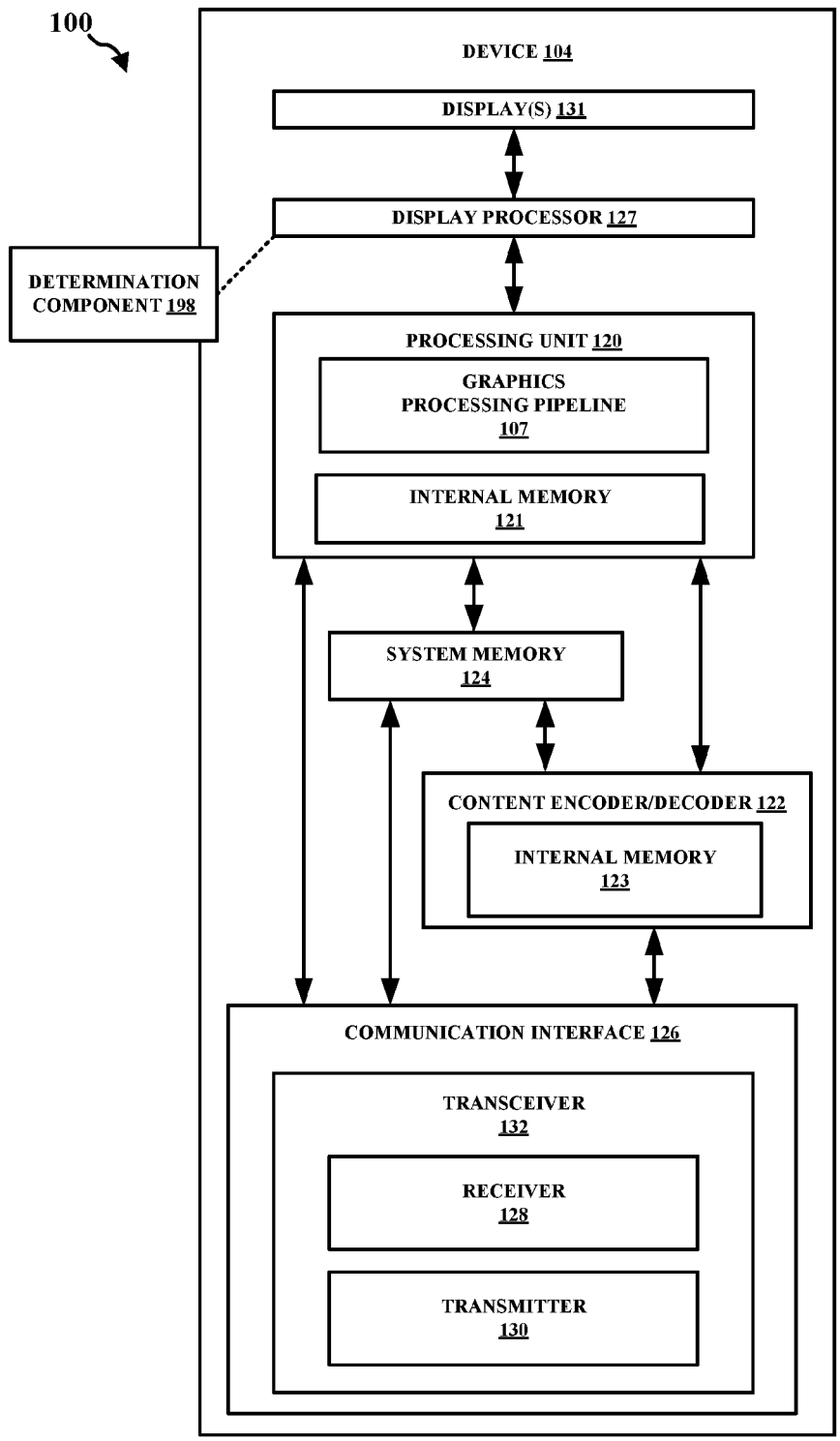
FIG. 1 is a block diagram that illustrates an example content generation system in accordance with one or more techniques of this disclosure.

Some aspects of display processing utilize a number of visualization techniques for computing images, e.g., saliency maps. Saliency maps utilize the concept of saliency in images, where saliency may refer to a number of features, e.g., pixels, resolution, etc., of an image or frame in the context of display processing. The aforementioned features may depict the visually alluring locations, i.e., the 'salient' locations, in an image or frame. Saliency maps are topographical representations of these visually alluring or salient locations in an image or frame. For instance, saliency maps can help to highlight the foreground of an image compared to the background of an image. Photographic images may accurately depict the precise colors of objects and scenes in an image. However, photographic images may not easily depict object depth within the image or the depth of visually alluring locations within the image. In contrast, certain painting techniques may depict depth in an image based on an aerial perspective or an atmospheric perspective, which refers to the effect the atmosphere has on the appearance of an object as viewed from a distance. For instance, as the distance between an object in an image and a viewer increases, the contrast between the object and its background decreases, and the contrast of any markings or details within the object also decreases. In order to depict this aerial or atmospheric perspective in an image, distant objects may be depicted with cooler colors, i.e., colors with a bluish tint, while closer objects may be depicted with warmer colors, i.e., colors with a reddish tint. Further, when utilizing aerial or atmospheric perspective, the colors of objects within the image may also become less saturated and shift towards the background color, which may correspond to a bluish tint in color. However, there may be other objects or colors in the image that would benefit from creating an illusion of depth. Aspects of the present disclosure may detect areas of interest within certain images, e.g., a photographic image, and bring these areas of interest into focus by creating an illusion of depth. For instance, aspects of the present disclosure may create an illusion of depth for areas of interest in an image via an aerial perspective or an atmospheric perspective. Further, aspects of the present disclosure may adaptively adjust pixel colors within an image based on saliency information of the pixels, such as via saliency maps. By doing so, aspects of the present disclosure may generate an atmospheric or aerial perspective within an image. Additionally, aspects of the present disclosure may decrease color saturation in the background of an image and increase color saturation in the foreground of an image.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a determination component 198 configured to detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames. The determination component 198 may also be configured to down-sample an image of the first frame to produce the down-sampled image of the first frame, where the down-sampled image is produced upon detecting at least one of the scene change between successive frames or the threshold number of received frames. The determination component 198 may also be configured to generate at least one of a saliency map or a depth map based on a down-sampled image of the first frame, the first frame including a plurality of first pixels and the down-sampled image including a plurality of down-sampled pixels. The determination component 198 may also be configured to apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames. The determination component 198 may also be configured to adjust at least one of the one or more low-saliency colors, the one or more high-saliency colors, or depth information of the plurality of the down-sampled pixels, where the depth information corresponds to the one or more colors including a depth within the depth range or the one or more colors including a depth outside of the depth range. Although the following description may be focused on display or image processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
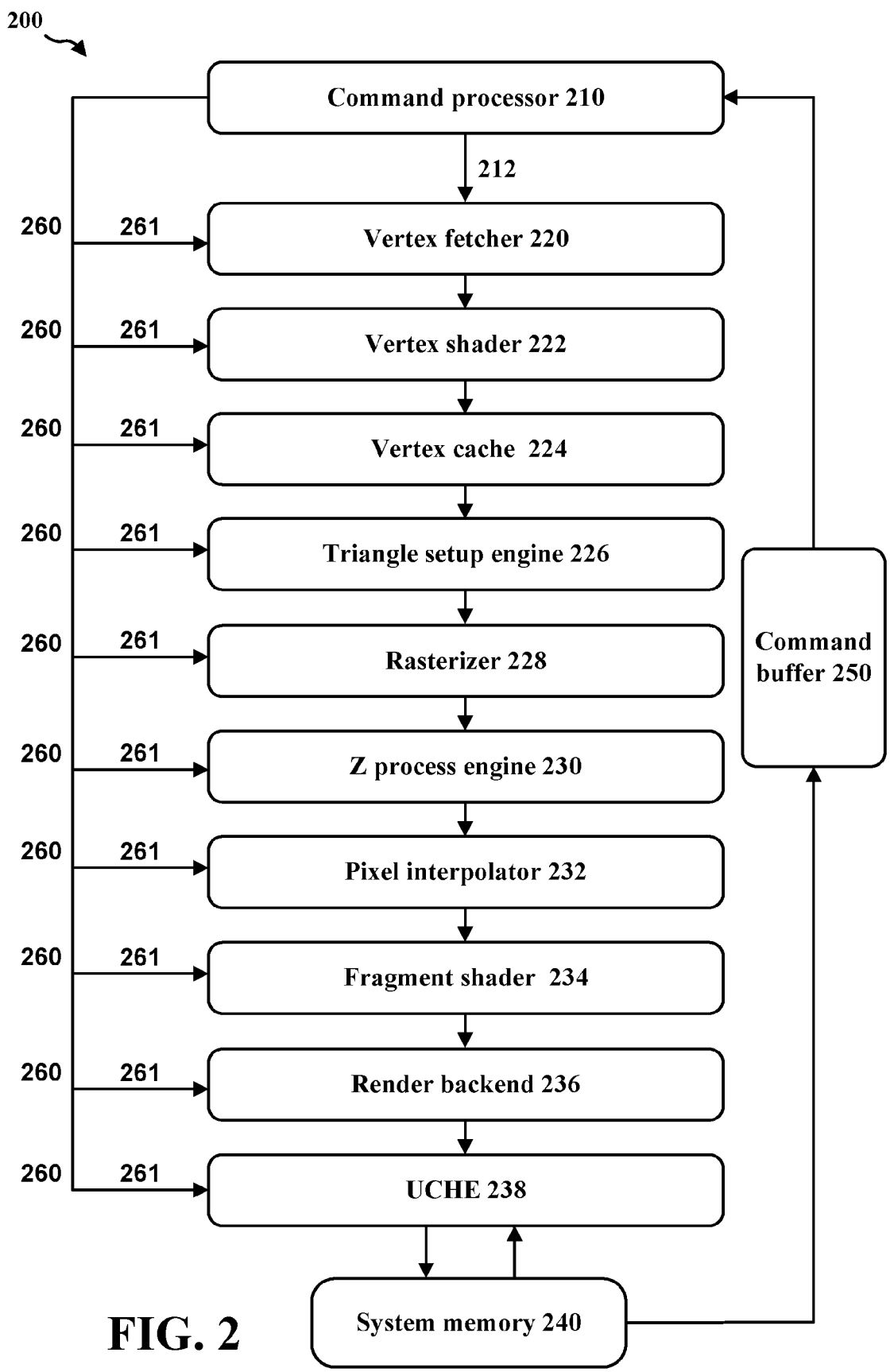
FIG. 2 is an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

In aspects of display or image processing, a number of different objects or colors may be adjusted or enhanced in an image or frame. By doing so, the objects or colors in an image may be improved, which may improve the overall appearance of the image. In order to adjust or enhance the objects or colors in an image, the objects or colors may need to be identified prior to the adjustment or enhancement. In some instances, this process may be performed in an image processing pipeline or a display processing pipeline. Moreover, this process may be referred to as an object or color identification process.

Figure 3:
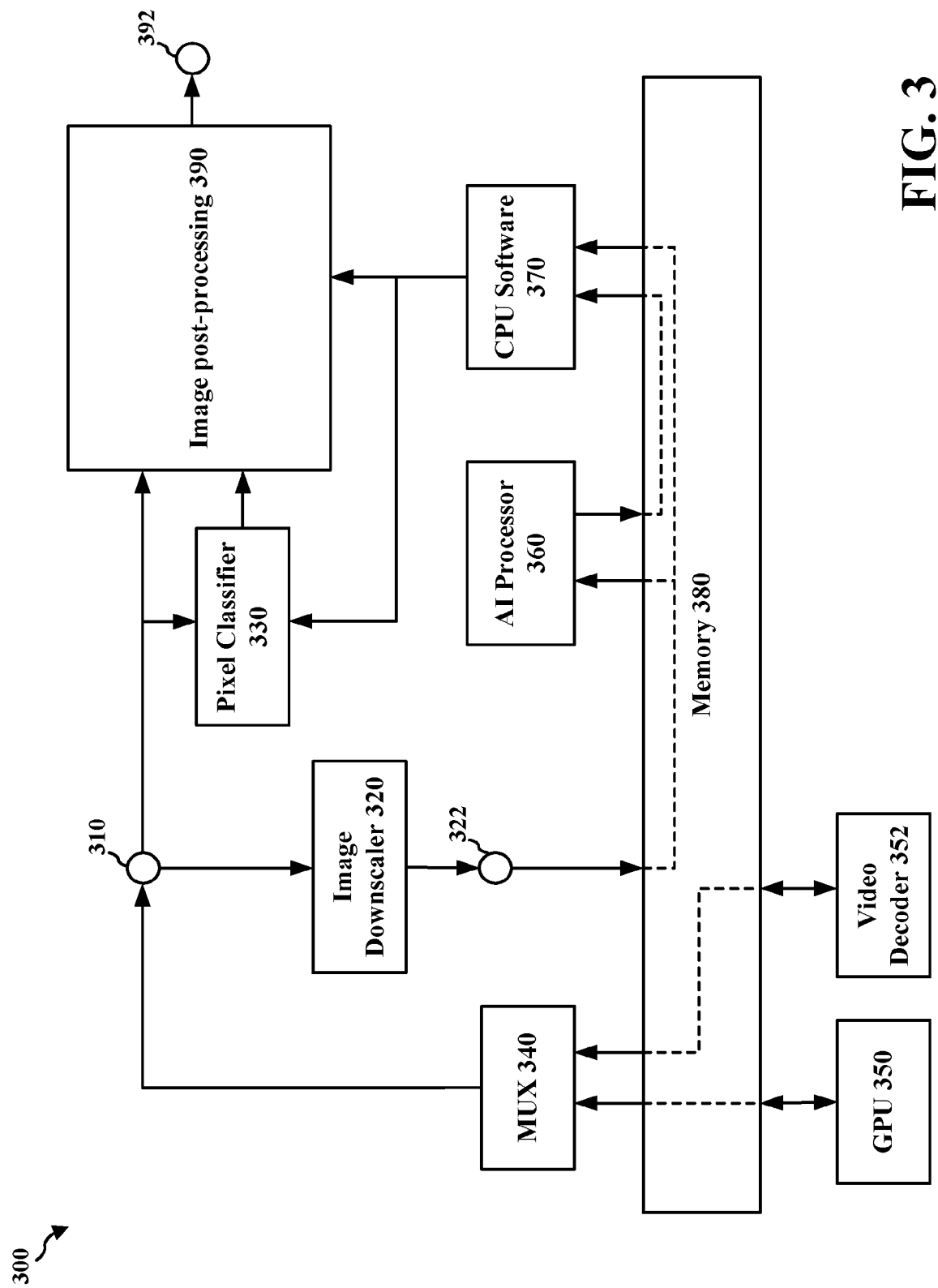
FIG. 3 is a diagram of components for display or image processing in accordance with one or more techniques of this disclosure.

FIG. 3 illustrates a diagram 300 of components for display or image processing. For instance, FIG. 3 illustrates an example structure for an object or color classification process. As shown in FIG. 3, diagram 300 may include input 310, image downscaler 320, frame selection step 322, pixel classifier 330, and multiplexer (MUX) 340. Diagram 300 can also include a content source, which can include a GPU 350 and/or a video decoder 352. Additionally, diagram 300 may include artificial intelligence (AI) processor or AI processing unit 360, CPU software 370, memory 380, image post-processing unit 390, and output 392. The input 310 of diagram 300 may include an image or image sequence. Also, the output 392 of diagram 300 may include the image or image sequence after processing.

As shown in FIG. 3, input 310 may communicate with image downscaler 320, pixel classifier 330, and image post-processing unit 390. Also, image downscaler 320 may communicate with frame selection step 322, e.g., to select a frame or image. Further, frame selection step 322 may communicate, e.g., a reduced resolution image, with AI processor 360 and/or CPU software 370, e.g., via memory 380. AI processor 360 may also communicate with CPU software 370 via memory 380. GPU 350 and video decoder 352 may communicate with MUX 340, e.g., via memory 380. MUX 340 may also communicate with input 310. Also, CPU software 370 may communicate with pixel classifier 330, e.g., a configuration update, and/or image post-processing unit 390. Pixel classifier 330 may also communicate with image post-processing unit 390. After this, image post-processing unit 390 may communicate with the output 392, e.g., an image or image sequence.

As further depicted in FIG. 3, the image post-processing unit 390 may be pre-frame composition or post-frame composition. In some aspects, diagram 300 may include a low-power real-time pixel processing pipeline, which may include input 310, image downscaler 320, pixel classifier 330, and/or image post-processing unit 390. Also, diagram 300 may include non-real-time processing, which may be performed on selected images or frames. This non-real-time processing may include frame selection step 322, MUX 340, GPU 350, video decoder 352, AI processor 360, CPU software 370, and memory 380. In some aspects, AI processor 360 may be referred to as a neural network processor. Also, the CPU software 370 may be utilized for a statistical analysis.

Figure 4:
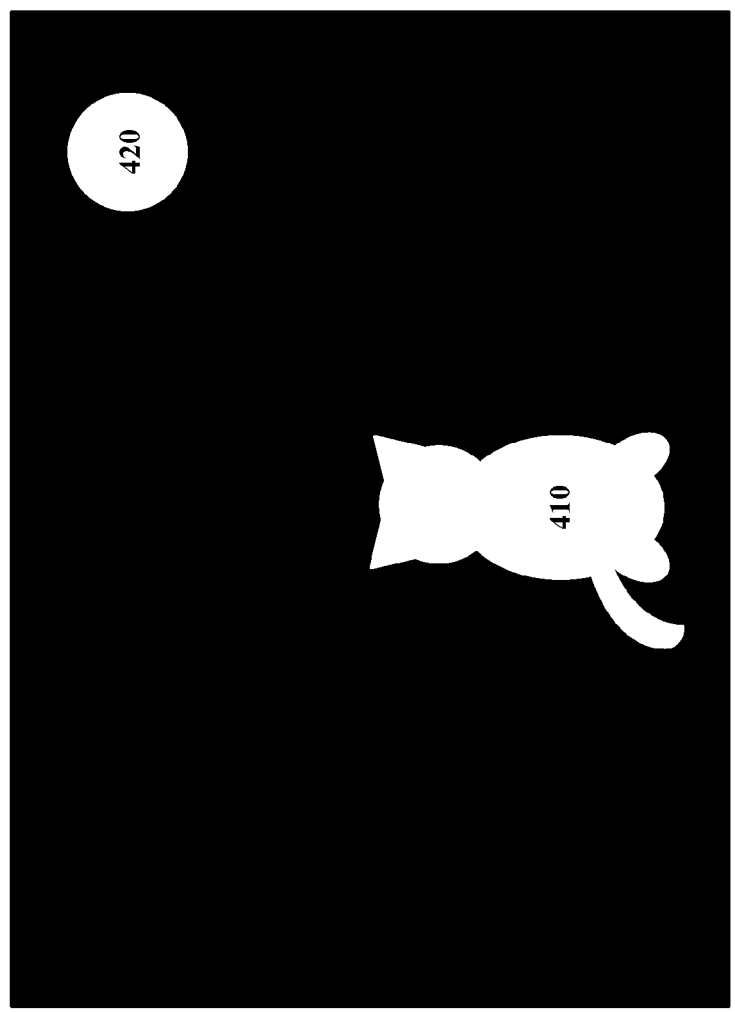
FIG. 4 is an example saliency map in accordance with one or more techniques of this disclosure.

Some aspects of display processing utilize a number of visualization techniques for computing images, e.g., saliency maps. Saliency maps utilize the concept of saliency in images, where saliency may refer to a number of features, e.g., pixels, resolution, etc., of an image or frame in the context of display processing. The aforementioned features may depict the visually alluring locations, i.e., the 'salient' locations, in an image or frame. Saliency maps are topographical representations of these visually alluring or salient locations in an image or frame. For instance, saliency maps can help to highlight the foreground of an image compared to the background of an image. In some instances, a neural network (NN) or a convolutional neural network (CNN) may be utilized to generate a saliency map. Aspects of the present disclosure may also utilize object segmentation maps. Object segmentation maps include binary classifications for each pixel, where each pixel is classified as being either in the foreground or the background of an image. FIG. 4 below is an example an object segmentation map, which may be another term used for foreground/background segmentation within an image or frame.

FIG. 4 is an example saliency map or object segmentation map 400 for display processing or image processing. As illustrated in FIG. 4, saliency/object segmentation map 400 corresponds to a respective image or photographic image. For instance, FIG. 4 is a saliency/object segmentation map 400 for a photographic image including a cat 410 and a moon 420. As shown in FIG. 4, saliency maps highlight the objects of interest, i.e., the salient objects, in an image. As depicted by saliency/object segmentation map 400, the cat 410 and the moon 420 are the objects of interest, i.e., the salient objects, in the corresponding photographic image.

Photographic images may accurately depict the precise colors of objects and scenes in an image. However, photographic images may not easily depict object depth within the image or the depth of visually alluring locations within the image. In contrast, certain painting techniques may depict depth in an image based on an aerial perspective or an atmospheric perspective, which refers to the effect the atmosphere has on the appearance of an object as viewed from a distance. For instance, as the distance between an object in an image and a viewer increases, the contrast between the object and its background decreases, and the contrast of any markings or details within the object also decreases.

In order to depict this aerial or atmospheric perspective in an image, distant objects may be depicted with cooler colors, i.e., colors with a bluish tint, while closer objects may be depicted with warmer colors, i.e., colors with a reddish tint. Further, when utilizing aerial or atmospheric perspective, the colors of objects within the image may also become less saturated and shift towards the background color, which may correspond to a bluish tint. However, there may be other objects or colors in the image that would benefit from creating an illusion of depth. Based on the above, it may be beneficial to detect areas of interest within certain images, e.g., a photographic image. It may also be beneficial to bring these areas of interest into focus by creating an illusion of depth. Moreover, it may be beneficial to create an illusion of depth for areas of interest in an image via an aerial perspective or an atmospheric perspective.

Aspects of the present disclosure may detect areas of interest within certain images, e.g., a photographic image, and bring these areas of interest into focus by creating an illusion of depth. For instance, aspects of the present disclosure may create an illusion of depth for areas of interest in an image via an aerial perspective or an atmospheric perspective. Further, aspects of the present disclosure may adaptively adjust pixel colors within an image based on saliency information of the pixels, such as via saliency maps. By doing so, aspects of the present disclosure may generate an atmospheric or aerial perspective within an image. Additionally, aspects of the present disclosure may decrease color saturation in the background of an image and increase color saturation in the foreground of an image.

In some instances, such as after detecting a scene change in an image, aspects of the present disclosure may downscale or down-sample an image. Aspects of the present disclosure may feed the down-sampled image to a neural network (NN) processor, e.g., a convolutional neural network (CNN), or an artificial intelligence (AI) analyzer. As a result, the neural network processor may produce or generate a saliency map or object segmentation map. The saliency map or object segmentation map may then be compared to the down-sampled image, e.g., with the use of software, and aspects of the present disclosure may analyze the colors of the down-sampled image compared to the salient objects in the saliency maps. As such, aspects of the present disclosure may determine which colors are part of a saliency group in the saliency map, as well as which colors are not part of the saliency group. Based on the analysis of salient colors, the saliency map may be converted into a set of high-saliency colors and a set of low-saliency colors.

After the analysis of salient colors, aspects of the present disclosure may utilize a color mapping function (CMF) or color processing engine, e.g., a three-dimensional (3D) look-up table (LUT), to adjust or re-map the colors in the image. In some instances, a color mapping function, e.g., a 3D LUT, may re-map high-saliency colors to higher saturated high-saliency colors, as well as re-map low-saliency colors to lower saturated low-saliency colors. For example, a color mapping function, e.g., a 3D LUT, may re-map foreground objects to higher saturated high-saliency colors, as well as re-map background objects to lower saturated low-saliency colors. In order to do so, aspects of the present disclosure may increase the saturation of foreground objects or shift the color of foreground objects towards warmer colors, (i.e., reddish colors). Also, aspects of the present disclosure may decrease the saturation of background objects or shift the color of background objects toward cooler colors (i.e., blueish colors).

Additionally, aspects of the present disclosure may reduce the amount of power utilized, e.g., at a DPU, to shift the saturation of colors in each frame. For instance, by analyzing a saliency map or object segmentation map upon detecting a scene change and utilizing a color mapping function, e.g., a 3D LUT, to re-map high-saliency and low-saliency colors, the amount of power utilized to shift the saturation of colors in each frame may be reduced. For example, a color mapping function, e.g., 3D LUT, configuration may be used for a number of frames after a detected scene change, such that a new saliency map analysis, e.g., with a neural network, may not be utilized on a per-frame basis. Rather, aspects of the present disclosure may perform a saliency and neural network analysis for a number of frames after a scene change or a threshold amount of frames, e.g., N frames, to reduce the amount of power utilized for these frames. So aspects of the present disclosure may save power, e.g., at a DPU, by utilizing a saliency and neural network analysis for a number of frames in a particular scene, as the colors in a particular scene may not change a significant amount. Accordingly, aspects of the present disclosure may utilize the same saliency analysis until there is another scene change, or until a threshold amount of frames, e.g., N frames.

In some instances, aspects of the present disclosure may utilize a neural network to compute a spatial map, e.g., a depth map, object segmentation map, or saliency map. This spatial map may identify the objects of interest in a frame, i.e., the foreground/background objects and/or the salient objects. For example, aspects of the present disclosure may perform a statistical analysis to determine which objects are in the foreground or the background of an image, as well as which objects are salient objects. Aspects of the present disclosure may then translate the spatial map, e.g., a depth map or saliency map, to a color map. The color map may then be utilized to adjust the colors in each frame in a scene, or until a threshold amount of frames is reached. Additionally, this color map may be tolerant to movement within the frame, so a new color map may not be needed for frames in the same scene, thus saving power.

Figure 5:
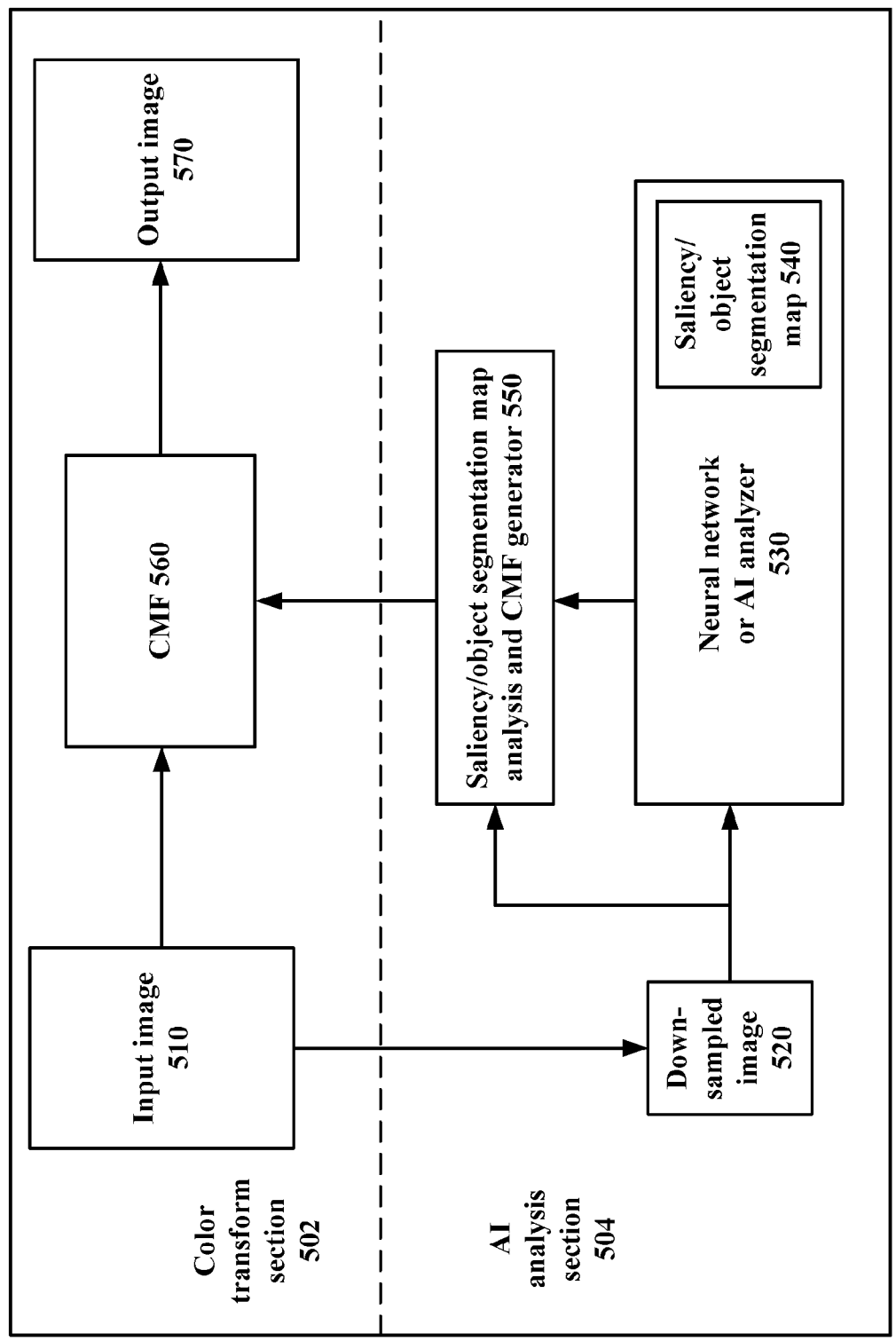
FIG. 5 is a diagram of components for a color transformation process in accordance with one or more techniques of this disclosure.

FIG. 5 is a diagram 500 of components for a color transformation process in accordance with one or more techniques of this disclosure. As shown in FIG. 5, diagram 500 includes a color transform section 502, an artificial intelligence (AI) analysis section 504, an input image 510, a down-sampled image 520, a neural network or AI analyzer 530, a saliency/object segmentation map 540, a saliency/object segmentation map analysis and color mapping function (CMF) generator 550, a color mapping function 560, and an output image 570. More specifically, diagram 500 in FIG. 5 includes a color transformation process utilizing a saliency/object segmentation map analysis and a CMF, e.g., a three dimensional (3D) look-up table (LUT). The color transformation process in FIG. 5 may be utilized to adjust the high-saliency colors or low-saliency colors of an image.

As shown in FIG. 5, aspects of the present disclosure may down-sample an input image 510 to produce a down-sampled image 520. This down-sampled image 520 may then be used to produce a saliency/object segmentation map 540, such as via a neural network 530. Next, aspects of the present disclosure may perform a saliency/object segmentation map analysis 550 of the saliency/object segmentation map 540, as well as include a CMF generator. Additionally, the saliency/object segmentation map analysis 550 may be combined with the CMF 560 to determine the low-saliency colors or the high-saliency colors of the image. Finally, the present disclosure may adjust the low-saliency colors or the high-saliency colors of the image and produce an output image 570. As shown in FIG. 5, aspects of the present disclosure may adjust the low-saliency colors or the high-saliency colors of an image to produce an atmospheric perspective or an aerial perspective within an image.

In some aspects, as shown in FIG. 5, upon detecting a scene change in an image, aspects of the present disclosure utilize the components in the AI analysis section 504, e.g., down-sampled image 520, neural network 530, saliency/object segmentation map 540, and saliency/object segmentation map analysis 550. For the rest of the frames in the scene, or until there is another scene change, aspects of the present disclosure may not perform the steps in the AI analysis section 504. That is, after performing the steps in the AI analysis section 504, each image or frame in a scene may be processed by the components in the color transform section 502, e.g., CMF 560. Accordingly, aspects of the present disclosure may utilize the same saliency analysis, e.g., the steps in color transform section 502, until there is another scene change, or until a threshold amount of frames, e.g., N frames. As such, the steps in color transform section 502 may be a real-time analysis. By doing so, aspects of the present disclosure may reduce the amount of power utilized to perform a color transformation process for each frame within a scene. Upon detecting another scene change, aspects of the present disclosure may perform the steps in the AI analysis section 504.

As indicated above, aspects of the present disclosure may analyze a saliency/object segmentation map in order to detect the high-saliency or low-saliency pixels in an image. These high-saliency or low-saliency pixels may then be analyzed along with a color histogram or CMF to determine the high-saliency or low-saliency colors in an image. For instance, aspects of the present disclosure may analyze the statistics indicating the relative likelihood that a particular color is associated with high-saliency or low-saliency pixels in a frame. In one example, if a certain color is associated with high-saliency pixels at a certain rate e.g., 90% of the instances where pixels with that color appear in a scene, then it may be identified as a high-saliency color. Also, if a color is associated with low-saliency pixels for a certain percentage of the instances, it may be identified as a low-saliency color. These high-saliency and low-saliency colors may be adjusted in order to produce an output image.

In some instances, aspects of the present disclosure may detect a scene change among successive frames or identify a threshold number of received frames (e.g., N frames), whichever occurs first. Upon doing so, aspects of the present disclosure may generate a saliency/object segmentation map for a particular frame, e.g., a frame that triggers the detection of the scene change among successive frames or the identification of a threshold number of received frames. Further, a saliency map may be generated based on a down-sampled image of the frame, such as by utilizing artificial intelligence (AI) analysis or a neural network (NN), e.g., a convolutional neural network (CNN).

Additionally, aspects of the present disclosure may identify low-saliency colors or high-saliency colors of a particular frame. These colors may be identified based on an analysis of the saliency/object segmentation map and the down-sampled image of the frame. In order to do so, aspects of the present disclosure may compare the saliency/object segmentation map to the down-sampled image of the frame, such as by detecting colors associated with areas of high-saliency in the frame, i.e., high-saliency colors. Aspects of the present disclosure may also compare the saliency map to the down-sampled image by detecting colors associated with areas of low-saliency in the frame, i.e., low-saliency colors.

As indicated above, aspects of the present disclosure may also generate a color mapping function (CMF), e.g., a 3D look-up table (LUT), based on the analysis of the saliency/object segmentation map compared to the down-sampled image of the frame. Further, aspects of the present disclosure may adjust the low-saliency colors and/or the high-saliency colors, such as via the CMF or 3D LUT. For instance, aspects of the present disclosure may decrease a color saturation for low-saliency colors, i.e., objects in the background of an image, and increase a color saturation for high-saliency colors, i.e., objects in the foreground of an image. Aspects of the present disclosure may also generate a CMF, e.g., 3D LUT, configuration such that high-saliency colors may receive a saturation boost and/or a shift toward warmer colors (i.e., reddish colors). Also, the generated CMF, e.g., 3D LUT, configuration may result in low-saliency colors receiving a saturation reduction and a shift toward cooler colors (i.e., blueish colors). Aspects of the present disclosure may also update the CMF, e.g., 3D LUT, with the newly generated color configuration.

Aspects of the present disclosure may input an initial image and output an adjusted image based on the aforementioned techniques. The adjusted image may be generated based on a saliency-based color adjustment of the pixels in the initial image. As indicated herein, the output image may receive a saturation boost and/or a warmer color shift for high-saliency colors in the image. Additionally, the output image may receive a saturation reduction and/or cooler color shift for low-saliency colors in the image.

Aspects of the present disclosure may include a number of benefits or advantages. For instance, aspects of the present disclosure may include a low-power method for an enhanced display using an artificial intelligence (AI) analysis or a neural network (NN). In some instances, the AI analysis may be performed on a small amount of input frames, e.g., frames corresponding to a scene change. Also, a NN or convolutional NN (CNN) may operate on a down-sampled version of the input frame. Pixels may be processed at a full-resolution using a low-power color transform block. Accordingly, aspects of the present disclosure may reduce the amount of power utilized for the image processing, e.g., at a DPU. Moreover, pixels may be processed using hardware based on a CMF, e.g., a 3D LUT. Aspects of the present disclosure may detect areas of interest in an image or frame and bring them into focus by creating an illusion of depth. As mentioned previously, this technique of the present disclosure may correspond to a technique referred to as atmospheric perspective or aerial perspective.

Figure 6:
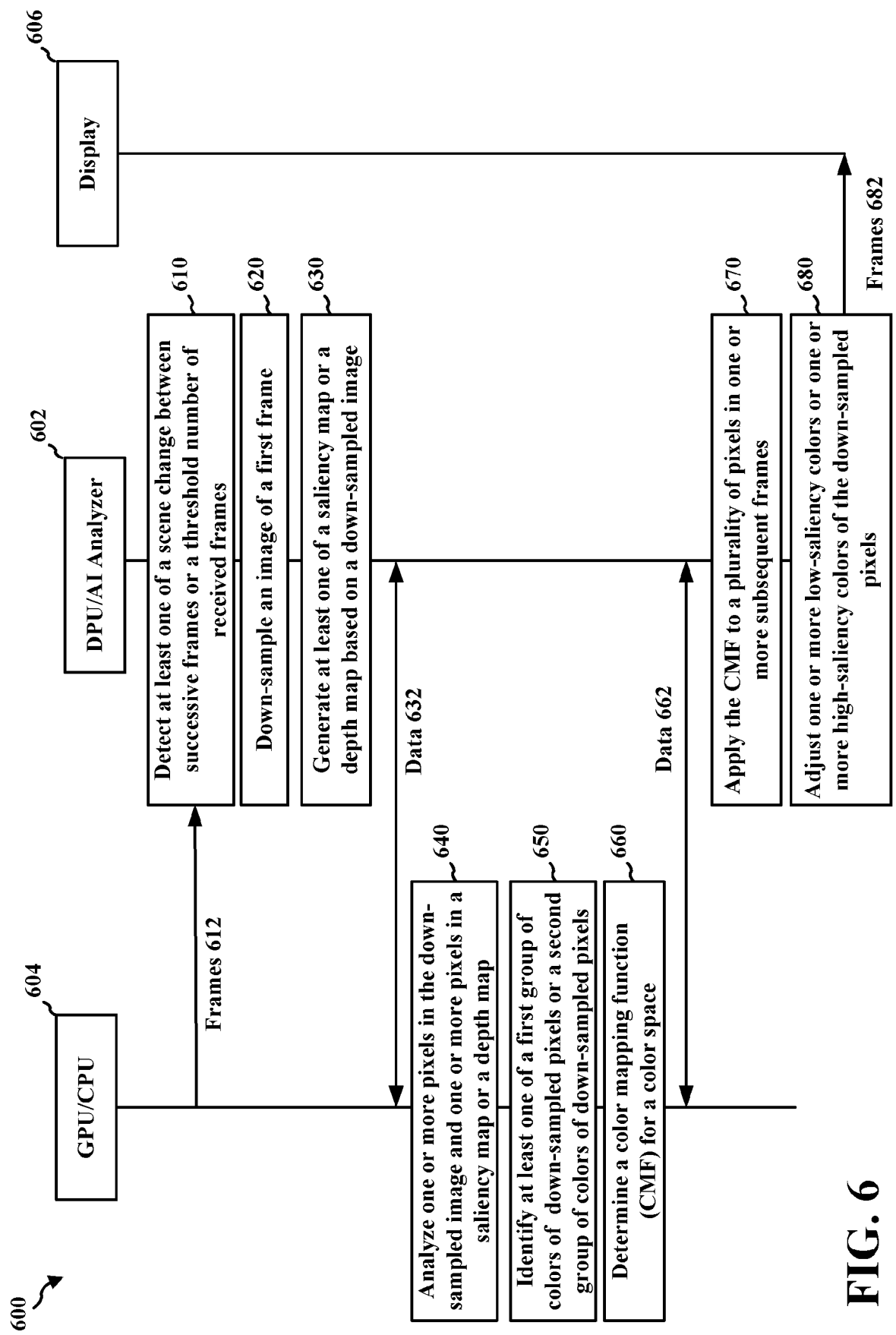
FIG. 6 is a communication flow diagram illustrating example communications between a GPU/CPU, a DPU, and a display in accordance with one or more techniques of this disclosure.

FIG. 6 is a communication flow diagram 600 of display processing in accordance with one or more techniques of this disclosure. As shown in FIG. 6, diagram 600 includes example communications between DPU/AI analyzer 602, GPU/CPU 604, and display 606, in accordance with one or more techniques of this disclosure.

At 610, DPU 602 may detect at least one of a scene change between successive frames of a plurality of frames, e.g., frames 612, or a threshold number of received frames of the plurality of frames, each of the plurality of frames including a plurality of pixels, a first frame of the plurality of frames corresponding to the scene change between successive frames or the threshold number of received frames. Also, each of the plurality of frames, e.g., frames 612, may be received at a DPU, e.g., DPU 602, from a GPU or CPU, e.g., GPU/CPU 604.

At 620, DPU 602 may down-sample an image of the first frame to produce the down-sampled image of the first frame, where the down-sampled image is produced upon detecting at least one of the scene change between successive frames or the threshold number of received frames.

At 630, DPU/AI analyzer 602 may generate at least one of a saliency map, and object segmentation map, or a depth map based on a down-sampled image of the first frame, the first frame including a plurality of first pixels and the down-sampled image including a plurality of down-sampled pixels. At least one of the saliency map, the object segmentation map, or the depth map may be generated using a neural network (NN), a convolutional neural network (CNN), or an artificial intelligence (AI) analysis. In some aspects, at least one of the saliency map, the object segmentation map, or the depth map may be based on at least one of saliency information of the first frame, depth information of the first frame, or object information of the first frame. Also, data 632 may be transferred between DPU/AI analyzer 602 and GPU/CPU 604.

At 640, CPU 604 may analyze one or more pixels in the down-sampled image and one or more pixels in at least one of the saliency map, the object segmentation map, or the depth map. In some instances, DPU 602 may perform a statistical analysis on the down-sampled image and at least one of the saliency map or the depth map. For example, analyzing the one or more pixels in the down-sampled image and the one or more pixels in at least one of the saliency map or the depth map may comprise performing a statistical analysis on the down-sampled image and at least one of the saliency map, the object segmentation map, or the depth map.

At 650, CPU 604 may identify, based on the down-sampled image and at least one of the saliency map or the depth map, at least one of a first group of colors of the plurality of down-sampled pixels or a second group of colors of the plurality of down-sampled pixels. In some aspects, the first group of colors may be one or more low-saliency colors or one or more colors including a depth within a depth range, and the second group of colors may be one or more high-saliency colors or one or more colors including a depth outside of a depth range.

At 660, CPU 604 may determine, based on the down-sampled image and at least one of the saliency map, the object segmentation map, or the depth map, a color mapping function (CMF) for a color space associated with the plurality of frames. In some instances, at least one of a saliency value, an object segmentation classification, or a depth value may correspond to each color of the color space associated with the plurality of frames, where the CMF may be determined based on at least one of the saliency value or the depth value for each color of the color space. Additionally, the CMF may be a polynomial or a three dimensional (3D) look-up table (LUT). Data 662 may be transferred between DPU/AI analyzer 602 and GPU/CPU 604.

At 670, DPU 602 may apply the CMF to the plurality of pixels in one or more subsequent frames of the plurality of frames, the CMF being applied until at least one of a subsequent scene change in the plurality of frames or a subsequent threshold number of received frames of the plurality of frames.

At 680, DPU 602 may adjust at least one of the one or more low-saliency colors or the one or more high-saliency colors, where depth information of the plurality of the down-sampled pixels corresponds to the one or more colors including a depth within the depth range or the one or more colors including a depth outside of the depth range. After adjusting at least one of the one or more low-saliency colors or the one or more high-saliency colors, DPU 602 may transmit one or more adjusted frames, e.g., frames 682, to a display, e.g., display 606.

Aspects of the present disclosure may analyze depth information to determine which depth values are correlated with pixels having low or high saliency in a given scene. For each down-sampled pixel, aspects of the present disclosure may determine depth information, saliency information, and foreground/background classification. Based on this, aspects of the present disclosure may analyze the statistics of which depth values are associated with low or high saliency. Once the depths (or ranges of depths) that are associated with high saliency are determined, aspects of the present disclosure may use this information to clean up the saliency map. For example, if a particular depth is likely to have objects of high saliency, aspects of the present disclosure may reassign the saliency for pixels having that particular depth to achieve a greater consistency across the pixels representing that object.

In some aspects, DPU 602 may decrease a saturation of the one or more low-saliency colors, decrease a luminance of the one or more low-saliency colors, and/or shift a color temperature of the one or more low-saliency colors towards a cooler color temperature. For example, adjusting the one or more low-saliency colors may comprise at least one of: decreasing a saturation of the one or more low-saliency colors; decreasing a luminance of the one or more low-saliency colors; or shifting a color temperature of the one or more low-saliency colors towards a cooler color temperature. Additionally, DPU 602 may increase a saturation of the one or more high-saliency colors, increase a luminance of the one or more high-saliency colors, and/or shift a color temperature of the one or more high-saliency colors towards a warmer color temperature. For example, adjusting the one or more high-saliency colors may comprise at least one of: increasing a saturation of the one or more high-saliency colors; increasing a luminance of the one or more high-saliency colors; or shifting a color temperature of the one or more high-saliency colors towards a warmer color temperature.

Moreover, at least one of the one or more low-saliency colors or the one or more high-saliency colors may be adjusted based on the depth information of the plurality of the down-sampled pixels. Further, DPU 602 may adjust one or more pixels associated with at least one of the saliency map, the object segmentation map, or the depth map. For example, adjusting at least one of the one or more low-saliency colors or the one or more high-saliency colors may comprise adjusting one or more pixels associated with at least one of the saliency map, the object segmentation map, or the depth map.

Figure 7:
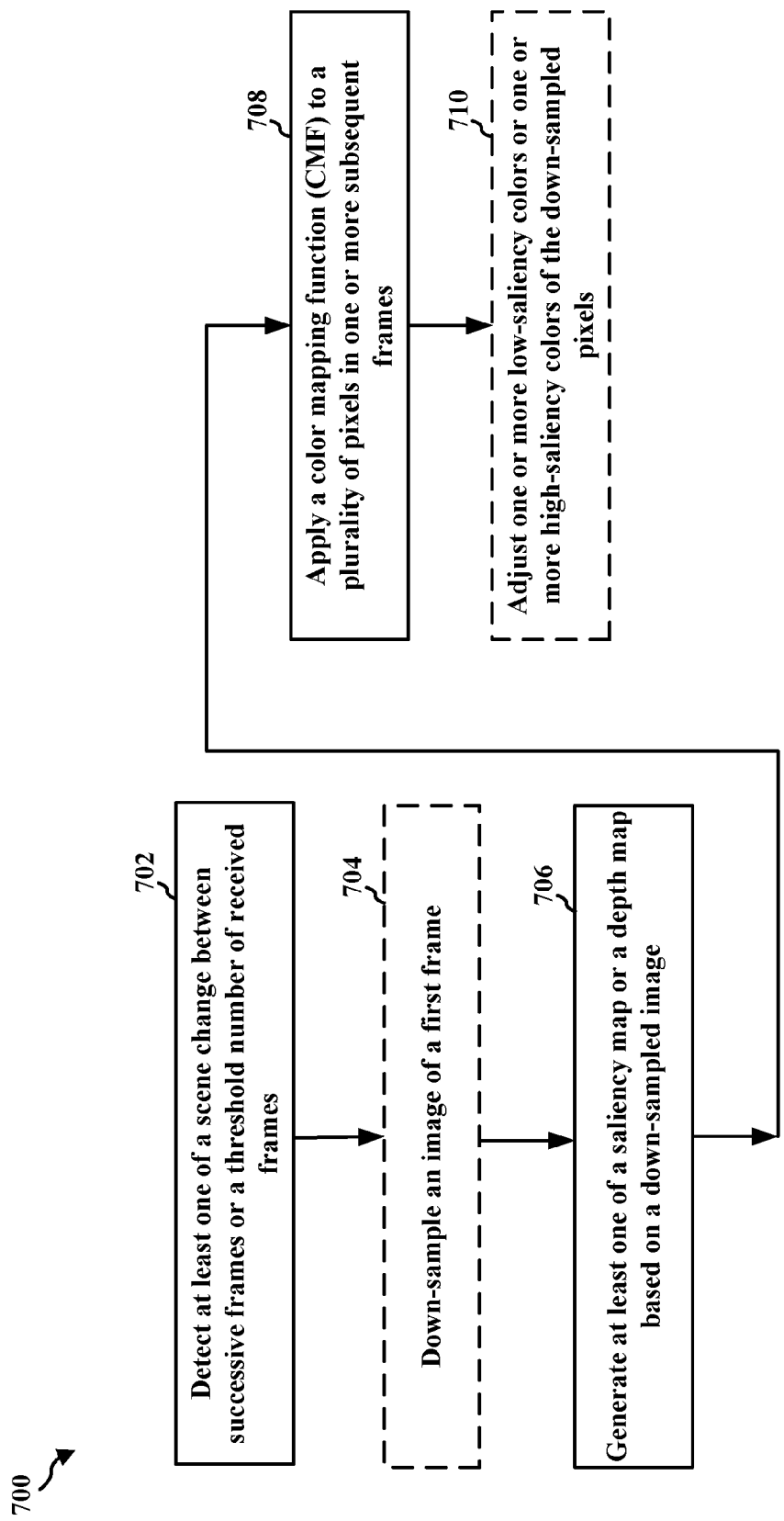
FIG. 7 is a flowchart of an example method of display processing in accordance with one or more techniques of this disclosure.

FIG. 7 is a flowchart 700 of an example method of graphics processing in accordance with one or more techniques of this disclosure. The method may be performed by an apparatus, such as an apparatus for display or image processing, a DPU, a display or image processor, a display pipeline, a wireless communication device, and/or any apparatus that can perform display or image processing as used in connection with the examples of FIGS. 1-6.

At 702, the apparatus may detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames, as described in connection with the examples in FIGS. 1-6. For example, DPU 602 may detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames. Further, display processor 127 may perform 702. Also, each of the plurality of frames may be received at a DPU from a GPU or CPU.

At 704, the apparatus may down-sample an image of the first frame to produce the down-sampled image of the first frame, where the down-sampled image is produced upon detecting at least one of the scene change between successive frames or the threshold number of received frames, as described in connection with the examples in FIGS. 1-6. For example, DPU 602 may down-sample an image of the first frame to produce the down-sampled image of the first frame, where the down-sampled image is produced upon detecting at least one of the scene change between successive frames or the threshold number of received frames. Further, display processor 127 may perform 704.

At 706, the apparatus may generate at least one of a saliency map or a depth map based on a down-sampled image of the first frame, the first frame including a plurality of first pixels and the down-sampled image including a plurality of down-sampled pixels, as described in connection with the examples in FIGS. 1-6. For example, DPU 602 may generate at least one of a saliency map or a depth map based on a down-sampled image of the first frame, the first frame including a plurality of first pixels and the down-sampled image including a plurality of down-sampled pixels. Further, display processor 127 may perform 706. At least one of the saliency map, the object segmentation map, or the depth map may be generated using a neural network (NN), a convolutional neural network (CNN), or an artificial intelligence (AI) analysis. In some aspects, at least one of the saliency map, the object segmentation map, or the depth map may be based on at least one of saliency information of the first frame, depth information of the first frame, or object information of the first frame.

Additionally, one or more pixels in the down-sampled image and one or more pixels in at least one of the saliency map, the object segmentation map, or the depth map may be analyzed, as described in connection with the examples in FIGS. 1-6. In some instances, a statistical analysis may be performed on the down-sampled image and at least one of the saliency map, the object segmentation map, or the depth map.

Further, at least one of a first group of colors of the plurality of down-sampled pixels or a second group of colors of the plurality of down-sampled pixels may be identified based on the down-sampled image and at least one of the saliency map, the object segmentation map, or the depth map, as described in connection with the examples in FIGS. 1-6. In some aspects, the first group of colors may be one or more low-saliency colors or one or more colors including a depth within a depth range, and the second group of colors may be one or more high-saliency colors or one or more colors including a depth outside of a depth range.

In some instances, at least one of a saliency value, an object segmentation classification, or a depth value may correspond to each color of the color space associated with the plurality of frames, where a color mapping function (CMF) for a color space associated with the plurality of frames may be determined based on at least one of the saliency value or the depth value for each color of the color space. Additionally, the CMF may be a polynomial or a three dimensional (3D) look-up table (LUT).

At 708, the apparatus may apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames, as described in connection with the examples in FIGS. 1-6. For example, DPU 602 may apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames. Further, display processor 127 may perform 708.

At 710, the apparatus may adjust at least one of the one or more low-saliency colors or the one or more high-saliency colors, where depth information of the plurality of the down-sampled pixels corresponds to the one or more colors including a depth within the depth range or the one or more colors including a depth outside of the depth range, as described in connection with the examples in FIGS. 1-6. For example, DPU 602 may adjust at least one of the one or more low-saliency colors, the one or more high-saliency colors, or depth information of the plurality of the down-sampled pixels, where the depth information corresponds to the one or more colors including a depth within the depth range or the one or more colors including a depth outside of the depth range. Further, display processor 127 may perform 710. After adjusting at least one of the one or more low-saliency colors, the one or more high-saliency colors, or depth information of the plurality of the down-sampled pixels, the apparatus may transmit one or more adjusted frames to a display.

In some aspects, the apparatus may decrease a saturation of the one or more low-saliency colors, decrease a luminance of the one or more low-saliency colors, and/or shift a color temperature of the one or more low-saliency colors towards a cooler color temperature. For example, adjusting the one or more low-saliency colors may comprise at least one of: decreasing a saturation of the one or more low-saliency colors; decreasing a luminance of the one or more low-saliency colors; or shifting a color temperature of the one or more low-saliency colors towards a cooler color temperature. Further, the apparatus may increase a saturation of the one or more high-saliency colors, increase a luminance of the one or more high-saliency colors, and/or shift a color temperature of the one or more high-saliency colors towards a warmer color temperature. For example, adjusting the one or more high-saliency colors may comprise at least one of: increasing a saturation of the one or more high-saliency colors; increasing a luminance of the one or more high-saliency colors; or shifting a color temperature of the one or more high-saliency colors towards a warmer color temperature.

Additionally, at least one of the one or more low-saliency colors or the one or more high-saliency colors may be adjusted based on the depth information of the plurality of the down-sampled pixels. Moreover, the apparatus may adjust one or more pixels associated with at least one of the saliency map, the object segmentation map, or the depth map. For example, adjusting at least one of the one or more low-saliency colors or the one or more high-saliency colors may comprise adjusting one or more pixels associated with at least one of the saliency map, the object segmentation map, or the depth map.

In configurations, a method or an apparatus for display processing is provided. The apparatus may be a DPU, a display or image processor, or some other processor that may perform display or image processing. In aspects, the apparatus may be the display processor 127 within the device 104, or may be some other hardware within the device 104 or another device. The apparatus, e.g., display processor 127, may include means for detecting at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames; means for generating at least one of a saliency map or a depth map based on a down-sampled image of the first frame, the first frame including a plurality of first pixels and the down-sampled image including a plurality of down-sampled pixels; means for determining, based on the down-sampled image and at least one of the saliency map or the depth map, a color mapping function (CMF) for a color space associated with the plurality of frames; means for applying the CMF to the plurality of pixels in one or more subsequent frames of the plurality of frames, the CMF being applied until at least one of a subsequent scene change in the plurality of frames or a subsequent threshold number of received frames of the plurality of frames; means for identifying, based on the down-sampled image and at least one of the saliency map or the depth map, at least one of a first group of colors of the plurality of down-sampled pixels or a second group of colors of the plurality of down-sampled pixels; means for adjusting at least one of the one or more low-saliency colors, the one or more high-saliency colors, or depth information of the plurality of the down-sampled pixels, where the depth information corresponds to the one or more colors including a depth within the depth range or the one or more colors including a depth outside of the depth range; means for decreasing a saturation of the one or more low-saliency colors; means for decreasing a luminance of the one or more low-saliency colors; means for shifting a color temperature of the one or more low-saliency colors towards a cooler color temperature; means for increasing a saturation of the one or more high-saliency colors; means for increasing a luminance of the one or more high-saliency colors; means for shifting a color temperature of the one or more high-saliency colors towards a warmer color temperature; means for increasing the depth information corresponding to the one or more colors including a depth within the depth range; means for increasing the depth information corresponding to the one or more colors including a depth outside of the depth range; means for decreasing the depth information corresponding to the one or more colors including a depth within the depth range; means for decreasing the depth information corresponding to the one or more colors including a depth outside of the depth range; means for adjusting at least one of one or more pixels in the saliency map or one or more pixels in the depth map; means for analyzing one or more pixels in the down-sampled image and one or more pixels in at least one of the saliency map or the depth map; means for performing a statistical analysis on the down-sampled image and at least one of the saliency map or the depth map; and means for down-sampling an image of the first frame to produce the down-sampled image of the first frame, where the down-sampled image is produced upon detecting at least one of the scene change between successive frames or the threshold number of received frames.

The subject matter described herein can be implemented to realize one or more benefits or advantages. For instance, the described display processing techniques can be used by a DPU, a display processor, or some other processor that can perform display or image processing to implement the saliency based color enhancement techniques described herein. This can also be accomplished at a low cost compared to other display processing techniques. Moreover, the display processing techniques herein can improve or speed up data processing or execution. Further, the display processing techniques herein can improve resource or data utilization and/or resource efficiency. Additionally, aspects of the present disclosure can utilize saliency based color enhancement techniques in order to reduce power consumption, improve memory bandwidth, and/or reduce performance overhead at a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display or image processing. The method includes detecting at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames; generating at least one of a saliency map, an object segmentation map, or a depth map based on a down-sampled image of the first frame, the first frame including a plurality of first pixels and the down-sampled image including a plurality of down-sampled pixels; and applying a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames.

Aspect 2 is the method of aspect 1, where at least one of a first group of colors of the plurality of down-sampled pixels or a second group of colors of the plurality of down-sampled pixels is identified based on the down-sampled image and at least one of the saliency map, the object segmentation map, or the depth map.

Aspect 3 is the method of any of aspects 1 and 2, where the first group of colors are one or more low-saliency colors or one or more colors including a depth within a depth range, and the second group of colors are one or more high-saliency colors or one or more colors including a depth outside of a depth range.

Aspect 4 is the method of any of aspects 1 to 3, further including adjusting at least one of the one or more low-saliency colors or the one or more high-saliency colors, where depth information of the plurality of the down-sampled pixels corresponds to the one or more colors including a depth within the depth range or the one or more colors including a depth outside of the depth range.

Aspect 5 is the method of any of aspects 1 to 4, where adjusting the one or more low-saliency colors comprises at least one of: decreasing a saturation of the one or more low-saliency colors; decreasing a luminance of the one or more low-saliency colors; or shifting a color temperature of the one or more low-saliency colors towards a cooler color temperature.

Aspect 6 is the method of any of aspects 1 to 5, where adjusting the one or more high-saliency colors comprises at least one of: increasing a saturation of the one or more high-saliency colors; increasing a luminance of the one or more high-saliency colors; or shifting a color temperature of the one or more high-saliency colors towards a warmer color temperature.

Aspect 7 is the method of any of aspects 1 to 6, where at least one of the one or more low-saliency colors or the one or more high-saliency colors is adjusted based on the depth information of the plurality of the down-sampled pixels.

Aspect 8 is the method of any of aspects 1 to 7, where adjusting at least one of the one or more low-saliency colors or the one or more high-saliency colors comprises: adjusting one or more pixels associated with at least one of the saliency map, the object segmentation map, or the depth map.

Aspect 9 is the method of any of aspects 1 to 8, where at least one of a saliency value, an object segmentation classification, or a depth value corresponds to each color of the color space associated with the plurality of frames, where the CMF is determined based on at least one of the saliency value or the depth value for each color of the color space.

Aspect 10 is the method of any of aspects 1 to 9, where one or more pixels in the down-sampled image and one or more pixels in at least one of the saliency map, the object segmentation map, or the depth map are analyzed.

Aspect 11 is the method of any of aspects 1 to 10, where a statistical analysis is performed on the down-sampled image and at least one of the saliency map, the object segmentation map, or the depth map.

Aspect 12 is the method of any of aspects 1 to 11, where at least one of the saliency map, the object segmentation map, or the depth map is based on at least one of saliency information of the first frame, depth information of the first frame, or object information of the first frame.

Aspect 13 is the method of any of aspects 1 to 12, where at least one of the saliency map, the object segmentation map, or the depth map is generated using a neural network (NN), a convolutional neural network (CNN), or an artificial intelligence (AI) analysis.

Aspect 14 is the method of any of aspects 1 to 13, where the CMF is a polynomial or a three dimensional (3D) look-up table (LUT).

Aspect 15 is the method of any of aspects 1 to 14, further including down-sampling an image of the first frame to produce the down-sampled image of the first frame, where the down-sampled image is produced upon detecting at least one of the scene change between successive frames or the threshold number of received frames.

Aspect 16 is the method of any of aspects 1 to 15, where each of the plurality of frames is received at a display processing unit (DPU).

Aspect 17 is an apparatus for display processing including at least one processor coupled to a memory and configured to implement a method as in any of aspects 1 to 16.

Aspect 18 is an apparatus for display processing including means for implementing a method as in any of aspects 1 to 16.

Aspect 19 is a computer-readable medium storing computer executable code, the code when executed by at least one processor causes the at least one processor to implement a method as in any of aspects 1 to 16.

What is claimed is:

1. A method of display processing, comprising:
detecting at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames;
generating at least one of a saliency map, an object segmentation map, or a depth map based on a down-sampled image of the first frame, the first frame including a plurality of first pixels and the down-sampled image including a plurality of down-sampled pixels; and
applying a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames.

2. The method of claim 1, wherein at least one of a first group of colors of the plurality of down-sampled pixels or a second group of colors of the plurality of down-sampled pixels is identified based on the down-sampled image and at least one of the saliency map, the object segmentation map, or the depth map.

3. The method of claim 2, wherein the first group of colors are one or more low-saliency colors or one or more colors including a depth within a depth range, and the second group of colors are one or more high-saliency colors or one or more colors including a depth outside of a depth range.

4. The method of claim 3, further comprising:
adjusting at least one of the one or more low-saliency colors or the one or more high-saliency colors, wherein depth information of the plurality of the down-sampled pixels corresponds to the one or more colors including a depth within the depth range or the one or more colors including a depth outside of the depth range.

5. The method of claim 4, wherein adjusting the one or more low-saliency colors comprises at least one of:
decreasing a saturation of the one or more low-saliency colors;
decreasing a luminance of the one or more low-saliency colors; or
shifting a color temperature of the one or more low-saliency colors towards a cooler color temperature.

6. The method of claim 4, wherein adjusting the one or more high-saliency colors comprises at least one of:

increasing a saturation of the one or more high-saliency colors;
increasing a luminance of the one or more high-saliency colors; or
shifting a color temperature of the one or more high-saliency colors towards a warmer color temperature.

7. The method of claim 4, wherein at least one of the one or more low-saliency colors or the one or more high-saliency colors is adjusted based on the depth information of the plurality of the down-sampled pixels.

8. The method of claim 4, wherein adjusting at least one of the one or more low-saliency colors or the one or more high-saliency colors comprises:
adjusting one or more pixels associated with at least one of the saliency map, the object segmentation map, or the depth map.

9. The method of claim 1, wherein at least one of a saliency value, an object segmentation classification, or a depth value corresponds to each color of the color space associated with the plurality of frames, wherein the CMF is determined based on at least one of the saliency value or the depth value for each color of the color space.

10. The method of claim 1, wherein one or more pixels in the down-sampled image and one or more pixels in at least one of the saliency map, the object segmentation map, or the depth map are analyzed.

11. The method of claim 10, wherein a statistical analysis is performed on the down-sampled image and at least one of the saliency map, the object segmentation map, or the depth map.

12. The method of claim 1, wherein at least one of the saliency map, the object segmentation map, or the depth map is based on at least one of saliency information of the first frame, depth information of the first frame, or object information of the first frame.

13. The method of claim 1, wherein at least one of the saliency map, the object segmentation map, or the depth map is generated using a neural network (NN), a convolutional neural network (CNN), or an artificial intelligence (AI) analysis.

14. The method of claim 1, wherein the CMF is a polynomial or a three dimensional (3D) look-up table (LUT).

15. The method of claim 1, further comprising:
down-sampling an image of the first frame to produce the down-sampled image of the first frame, wherein the down-sampled image is produced upon detecting at least one of the scene change between successive frames or the threshold number of received frames.

16. The method of claim 1, wherein each of the plurality of frames is received at a display processing unit (DPU).

17. An apparatus for display processing, comprising:
a memory; and
at least one processor coupled to the memory and configured to:
detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames;
generate at least one of a saliency map, an object segmentation map, or a depth map based on a down-sampled image of the first frame, the first frame including a plurality of first pixels and the down-sampled image including a plurality of down-sampled pixels; and
apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames.

18. The apparatus of claim 17, wherein at least one of a first group of colors of the plurality of down-sampled pixels or a second group of colors of the plurality of down-sampled pixels is identified based on the down-sampled image and at least one of the saliency map, the object segmentation map, or the depth map.

19. The apparatus of claim 18, wherein the first group of colors are one or more low-saliency colors or one or more colors including a depth within a depth range, and the second group of colors are one or more high-saliency colors or one or more colors including a depth outside of a depth range.

20. The apparatus of claim 19, wherein the at least one processor is further configured to:
adjust at least one of the one or more low-saliency colors or the one or more high-saliency colors, wherein depth information of the plurality of the down-sampled pixels corresponds to the one or more colors including a depth within the depth range or the one or more colors including a depth outside of the depth range.

21. The apparatus of claim 20, wherein adjusting the one or more low-saliency colors comprises the at least one processor further configured to at least one of:
decrease a saturation of the one or more low-saliency colors;
decrease a luminance of the one or more low-saliency colors; or
shift a color temperature of the one or more low-saliency colors towards a cooler color temperature.

22. The apparatus of claim 20, wherein adjusting the one or more high-saliency colors comprises the at least one processor further configured to at least one of:
increase a saturation of the one or more high-saliency colors;
increase a luminance of the one or more high-saliency colors; or
shift a color temperature of the one or more high-saliency colors towards a warmer color temperature.

23. The apparatus of claim 20, wherein at least one of the one or more low-saliency colors or the one or more high-saliency colors is adjusted based on the depth information of the plurality of the down-sampled pixels.

24. The apparatus of claim 20, wherein adjusting at least one of the one or more low-saliency colors or the one or more high-saliency colors comprises the at least one processor further configured to:
adjust one or more pixels associated with at least one of the saliency map, the object segmentation map, or the depth map.

25. The apparatus of claim 17, wherein at least one of a saliency value, an object segmentation classification, or a depth value corresponds to each color of the color space associated with the plurality of frames, wherein the CMF is determined based on at least one of the saliency value or the depth value for each color of the color space.

26. The apparatus of claim 17, wherein one or more pixels in the down-sampled image and one or more pixels in at least one of the saliency map, the object segmentation map, or the depth map are analyzed.

27. The apparatus of claim 26, wherein a statistical analysis is performed on the down-sampled image and at least one of the saliency map, the object segmentation map, or the depth map.

28. The apparatus of claim 17, wherein at least one of the saliency map, the object segmentation map, or the depth map is based on at least one of saliency information of the first frame, depth information of the first frame, or object information of the first frame.

29. The apparatus of claim 17, wherein at least one of the saliency map, the object segmentation map, or the depth map is generated using a neural network (NN), a convolutional neural network (CNN), or an artificial intelligence (AI) analysis.

30. The apparatus of claim 17, wherein the CMF is a polynomial or a three dimensional (3D) look-up table (LUT).

31. The apparatus of claim 17, wherein the at least one processor is further configured to:
down-sample an image of the first frame to produce the down-sampled image of the first frame, wherein the down-sampled image is produced upon detecting at least one of the scene change between successive frames or the threshold number of received frames.

32. The apparatus of claim 17, wherein each of the plurality of frames is received at a display processing unit (DPU).

33. An apparatus for display processing, comprising:
means for detecting at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames;
means for generating at least one of a saliency map, an object segmentation map, or a depth map based on a down-sampled image of the first frame, the first frame including a plurality of first pixels and the down-sampled image including a plurality of down-sampled pixels; and
means for applying a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames.

34. A non-transitory computer-readable medium storing computer executable code for display processing, the code when executed by a processor causes the processor to:
detect at least one of a scene change between successive frames of a plurality of frames or a threshold number of received frames of the plurality of frames, each of the plurality of frames including a plurality of pixels, a first frame of the plurality of frames corresponding to the scene change between successive frames or the threshold number of received frames;
generate at least one of a saliency map, an object segmentation map, or a depth map based on a down-sampled image of the first frame, the first frame including a plurality of first pixels and the down-sampled image including a plurality of down-sampled pixels; and
apply a color mapping function (CMF) for a color space associated with the plurality of frames to the plurality of pixels in one or more subsequent frames of the plurality of frames, the CMF being applied until at least one of a subsequent scene change in the plurality of frames or a subsequent threshold number of received frames of the plurality of frames.

* * * * *